United States Patent [19]

Nighan et al.

[11] Patent Number: 4,660,210

[45] Date of Patent: Apr. 21, 1987

[54] TWO-HALOGEN DONOR MIXTURE FOR XEF (C→A) LASER

[75] Inventors: William L. Nighan, Manchester, Conn.; Frank K. Tittel; William L. Wilson, Jr., both of Houston, Tex.

[73] Assignee: United Technologies Corporation, Hartford, Conn.

[21] Appl. No.: 840,982

[22] Filed: Mar. 14, 1986

Related U.S. Application Data

[63] Continuation of Ser. No. 557,722, Dec. 1, 1983.

[51] Int. Cl.$^4$ .............................................. H01S 3/22
[52] U.S. Cl. ......................................... 372/60; 372/57
[58] Field of Search ........................ 372/55, 57, 59, 60

[56] References Cited

U.S. PATENT DOCUMENTS 4,348,647  9/1982  Nighan et al. ........................ 372/57

OTHER PUBLICATIONS

Bychkov et al., "Laser Utilizing an Ar—Xe—NF$_3$ Mixture with a Discharge Stabilized by a Short-Pulse Electron Beam"; Sov. Jqe, vol. 9(5), May 79.

Hasson et al.; "Gain and Fluorescence Measurements in Photoionization-Stabilized XeF Discharge Lasers Operat. at High Energy Loadings", Appl. Phys. Lett., vol. 31, No. 3, Aug. 1977.

Tuxworth et al., "Operations of Discharge-Excited KrF and XeF Lasers at Elevated Temp."; J. Phys. D.-Appl. Phys. 13 p. 135, Feb. 1980.

Nighan et al., "Synthesis of Rare Gas–halide Mixtures Resulting in Efficient XeF (C→A) Laser Oscill." Appl. Phys. Lett. 45(9), Nov. 1984.

Nachshon et al., "Efficient XeF (C→A) Laser Oscill. Using Electron–Beam Excitation"; J. Appl. Phys. 56(1), Jul. 84.

Nighan et al., "Optimization of Electrically Excited XeF (C→A) Laser Performance", Appl. Phys. Lett., vol. 42, No. 12, p. 1006, Jun. 15, 83.

Primary Examiner—Leon Scott, Jr.
Attorney, Agent, or Firm—Eric W. Petraske

[57] ABSTRACT

An improved electric discharge XeF excimer laser employs a reaction gas mixture containing NF$_3$ and F$_2$ in proportions that tailor the kinetics of the electrochemical reactions in order to achieve a substantial increase in power.

7 Claims, 4 Drawing Figures

TWO-HALOGEN DONOR MIXTURE FOR XEF (C→A) LASER

The Government has rights in this invention pursuant to Contract No. N00014-76-C-0847 awarded by the Department of the Navy.

This application is a continuation of application Ser. No. 557,722, filed on 12/1/83.

TECHNICAL FIELD

The field of the invention is that of excimer lasers.

BACKGROUND ART

Excimer lasers use a lasing species that is an electronically excited, unstable compound that dissociates immediately after the lasing transition. A promising visible wavelength excimer laser uses XeF operating on a particular lasing transition that is referred to in the trade as the C→A transition (the letters C and A being conventional references to particular states of the excimer), and produces radiation in a broadband centered at a wavelength of about 486 nm. The prior art has used a gaseous mixture comprising a buffer gas, such as argon for example, together with a small amount of xenon and a donor gas which provides the necessary fluorine atoms. Most work has been done with $NF_3$ as the halogen donor gas, although $F_2$ has also been used.

Electrical excitation in the form of high-energy electron beams or electric discharges has been used to excite the XeF(C→A) laser in the art, but these methods have suffered from severe disadvantages that have limited their potential. In particular, the intense electrical excitation required to produce a sufficient number of excited XeF states results in a very large electron concentration but the electrons mix together the B and C states of the XeF excimer, thereby providing a channel for a competing reaction (B→X) that drains away excited states before they can provide the desired CX→A lasing transition. Also, electrical excitation results in large concentrations of ionized and excited species related to the mixture constituents (e.g., $Xe^{}$, $Ar^{}$, $Xe_2^*$, $Ar_3^+$ . . . ), several of which absorb within the wavelength range of the C→A transition, thereby limiting the net gain of the laser and severely limiting the buildup of optical flux in the laser cavity. Photolytic pumping of $XeF_2$ containing mixtures has been used successfully to minimize these effects, but the necessary apparatus required adds considerably to the complexity of the systems.

DISCLOSURE OF INVENTION

The invention relates to an improved gas mixture for the electrically excited XeF (C→A) laser in which the reaction gas includes a mixture containing both $NF_3$ and $F_2$ in proportions chosen so as to overcome the aforementioned problems by tailoring the kinetics of the reactions.

BRIEF DESCRIPTIONS OF DRAWINGS

BEST MODE OF CARRYING OUT THE INVENTION

Figure 1:
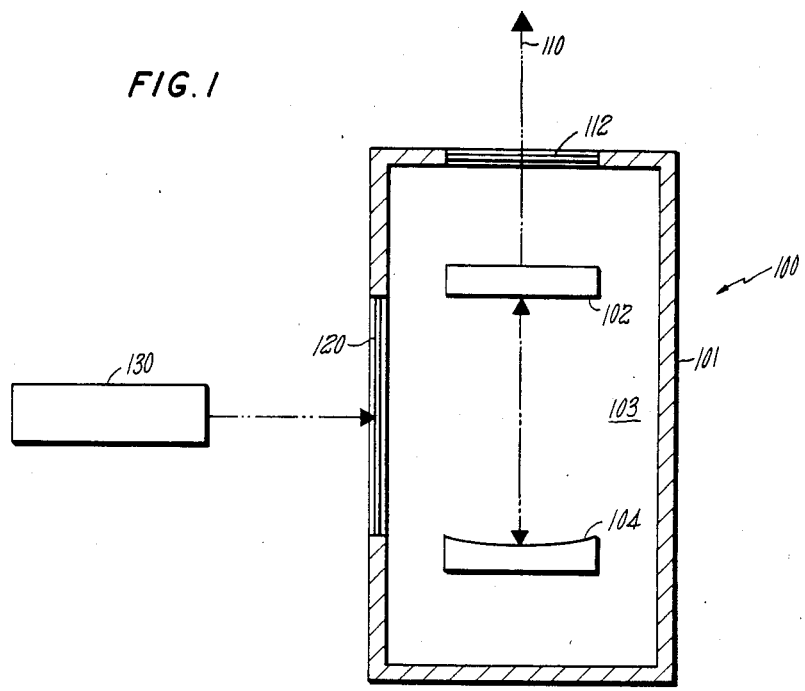
FIG. 1 illustrates an apparatus for practicing the invention.

FIG. 1 illustrates in simplified form an apparatus for producing a XeF laser. The diagram is adapted from an article by Frank K. Tittel et al in the *IEEE Journal of Quantum Electronics,* Volume QE-17, page 2268, 1981. This prior art work used a gas mixture of argon, xenon and $NF_3$ to produce the lasing transition. In the diagram, gas cell 100 includes an optical cavity bounded by flat mirror 102 and curved mirror 104. Mirror 102 has a reflectance of 95% at the wavelength region of interest, permitting a portion of the radiation to pass out of the cavity through window 112 and emerge as output beam 110. Gas cell 100 contains a gas mixture indicated by the numeral 103 that was varied to investigate the dependence of laser output on gas composition. The laser was pumped by an electron beam from an apparatus indicated by the numeral 130, illustratively a Physics International Pulserad 110 electron beam generator. This machine is capable of producing 15 kA pulses of Mev electrons, with an 10 ns pulse duration. The electron beam passes through foil 120 which is a titanium foil 50 micrometers thick that serves to isolate gas mixture 103 from the vacuum surrounding the electron beam.

The gas cell, mounting hardware for the laser and the method of injecting electrons are part of the prior art and form no part of the invention, which is concerned with an improved gas mixture. Further details on the apparatus may be found in an article by G. Marowsky et al in *Applied Optics,* Vol. 17, page 3491, 1978. Other means of designing the optical resonator and/or injecting the electrons (or other high energy particles) are known to those skilled in the art.

When the XeF excimer laser was first developed, it offered great promise for providing a tunable laser source in the blue-green region of the spectrum. The device has been a disappointment, however, because the efficiency of converting electrical energy to output optical energy has been extremely low (typically much less than 0.01%), as a result of the two adverse factors mentioned above: the competition of the B→X transition and the absorption of laser radiation by other ionized and excited species that are present. The high concentration of electrons that is necessary to inject enough energy into the optical cavity has the unfortunate side effect that the B state of the XeF excimer is collisionally mixed by electrons with the C state, and both the B and C states are collisionally destroyed by the electrons as well. The B→X laser transition at 351 nm is highly efficient and tends to rob energy away from the population in the C state.

Figure 3A:
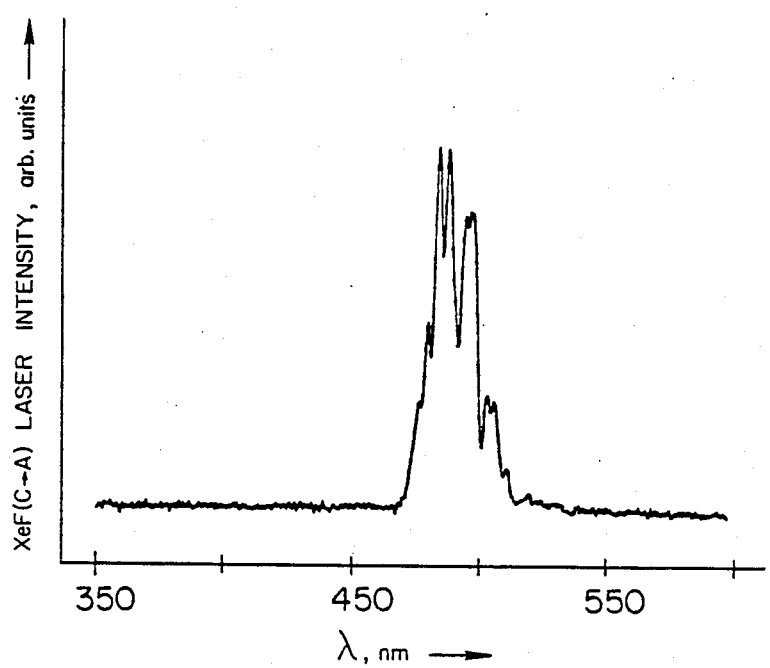
FIG. 3 illustrates the output spectrum of lasers constructed according to the invention.

When $NF_3$ is used as the source of fluorine atoms, during the excitation pulse the aforementioned absorbing species reach very high concentrations that decay slowly due to the fact that $NF_3$ has relatively small coefficients for quenching of ionized and excited species. A typical output spectrum of an XeF laser using $NF_3$ is shown in FIG. 3a in which the deep absorption lines are clearly evident.

Experiments in the art using molecular fluorine as the source of the halogen in the reaction have suffered from the fact that fluorine has an electron attachment coefficient that is significantly smaller than that of $NF_3$ for an average electron energy above approximately 1eV, which is the energy range of interest. The lower attachment coefficient results in a higher electron density when $F_2$ is used, and a lower production rate of the negative ion $F^-$, an important precursor species in the XeF production chain. Fluorine also quenches the XeF excimer at a much higher rate than $NF_3$ does. Even though the reaction of $F_2$ with $Xe^*$ produces $XeF^*$ (so that fluorine has the useful property of converting some absorbing species to laser species), the combined characteristics of $F_2$ are not optimum for use in the XeF(C→A) laser.

In order for an excimer laser to work, it is necessary that the highly artificial environment produced by electrical excitation generate the lasing species in sufficient quantity; not quench or otherwise destroy the excimers for a sufficiently long time so that they may form the lasing transition; not produce absorbing species and also not react chemically with other constituents of the gas mixture to produce a chemical (as opposed to electrochemical) reaction that would interfere with the lasing process. Recognition of these requirements, combined with understanding of the advantages and disadvantages of $NF_3$ and of $F_2$ as regards their influence on the densities of electrons and absorbing species in the XeF(C→A) laser medium, suggested to the inventors that use of $NF_3$ and $F_2$ together in electrically excited lasers would result in improved laser performance. Detailed calculations have been made (W. L. Nighan et al, *Applied Physics Letters*, Volume 42, page 1006, 1983) that establish the conditions (e.g. $NF_3$ and $F_2$ concentrations) for which the XeF(C) production would remain essentially the same while the concentrations of electrons and of absorbing species would be sharply reduced.

Generally, chemically reactive species cannot be mixed at will in excimer lasers because two species that operate satisfactorily by themselves may well react with each other to spoil the process. Equilibrium thermochemical calculations have shown that $NF_3$ and $F_2$ are chemically compatible for the conditions of interest and that other nitrogen compounds that may be produced in the reaction will be present at insignificant levels.

It should be stressed that the addition of $F_2$ to the usual $Xe-NF_3$ mixture is not done to provide an additional source of fluorine atoms. Ample fluorine can be provided by $NF_3$ alone. Rather, the $F_2$ serves to suppress the absorption of radiation by ionized and excited species, and in the case of Xe-related absorbers, by converting the undesired $Xe^{**}$ to the lasing species XeF. The use of $NF_3$ and $F_2$ together has resulted in a kinetically tailored fluorine - donor gas having a combination of electron attachment and excited state quenching characteristics that are far superior to those provided by either component acting alone.

Figure 2:
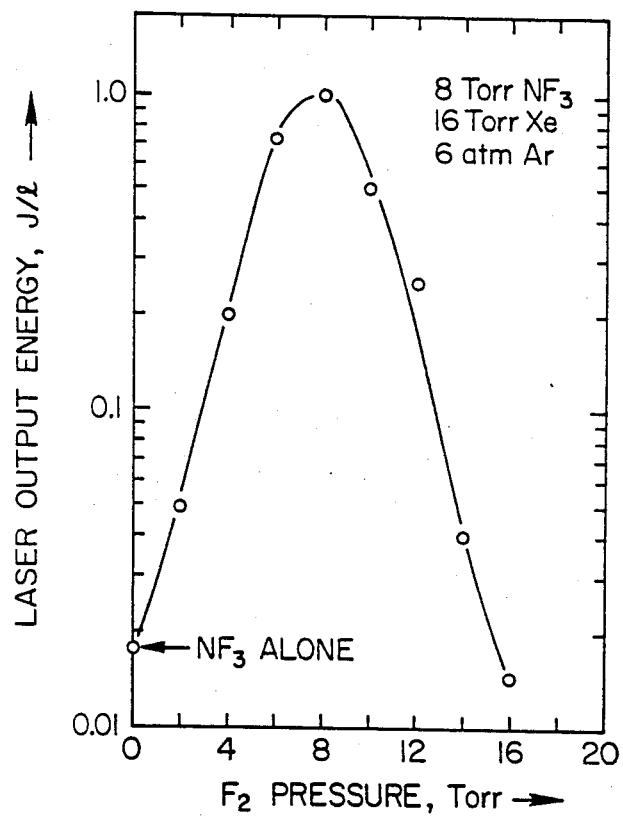
FIG. 2 illustrates a curve showing the dependence of output energy on the fluorine pressure.

A series of experiments were performed using an electron-beam excited gas mixture composed of 5-10 atmospheres of argon, 10-20 Torr Xe and varying amounts of $NF_3$ and $F_2$. Other rare-gas buffer gases such as neon may be substituted for the argon. FIG. 2 shows the output energy of the laser expressed in j/l for a gas mixture comprising 8 Torr of $NF_3$, 16 Torr of Xe and 10 atmospheres of argon together with a fluorine composition ranging from 0 to 16 Torr. It can be seen that the laser output energy for $NF_3$ alone is approximately 0.02 j/l rising to nearly two orders of magnitude higher (1.0), at a value of 8 Torr of $F_2$. The $NF_3$ pressure was found not to be critical, the range from 6 to 30 Torr being adequate. It has been found that the ratio of $NF_3$ to $F_2$ may be varied within the range $0.3 \leq NF_3/F_2 \leq 3.0$, with satisfactory performance. The argon pressure is also not critical, a pressure of greater than three atmospheres being suitable. Based on the estimated e-beam energy deposited in the active lasing volume, a laser output of a joule-per-liter corresponds to an intrinsic efficiency approaching one percent.

Figure 3B:
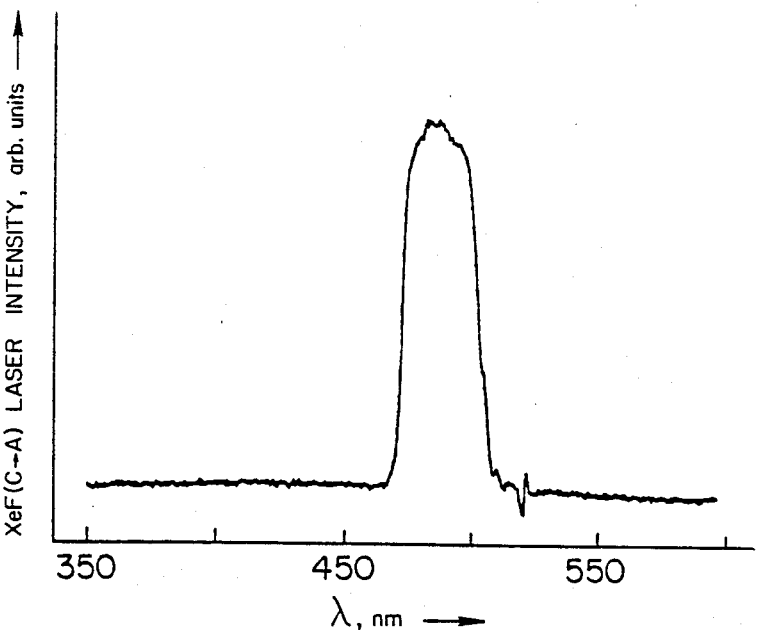

FIG. 3b illustrates the output spectrum for the gas mixture shown in FIG. 2 with 8 Torr of $NF_3$ and 8 Torr of $F_2$. This laser is the first one in which an electrically excited XeF excimer laser has produced a smooth output spectrum with minimal absorbing valleys provided by the Xe-excited states.

The results of this investigation demonstrate that by selective tailoring of the kinetic processes in electrically excited XeF(C→A) laser mixtures, the concentrations of electrons and of absorbing species can be maintained at levels compatible with efficient laser oscillation. It is believed that further improvements to the hardware of the laser cavity and/or the gas composition will result in even higher output energies. The XeF (C→A) laser, with its improved output power and tunability throughout the 460–510 nm range, promises to become a competitive optical source for a variety of applications.

We claim:

1. An excimer laser comprising:
    a gaseous gain medium within a bounded volume comprising a buffer gas, xenon and at least one fluorine donor gas;
    means for exciting said gain medium to form a quantity of xenon fluoride in a predetermined excited state; and
    means for extracting radiation from said bounded volume, wherein the improvement comprises;
    said at least one fluorine donor gas comprises a mixture of $NF_3$ and $F_2$ molecular species, each containing a predetermined, in a predetermined proportion such that said mixture of $NF_3$ and $F_2$ forms a synthesized fluorine donor gas that tailors kinetically and gaseous gain medium in a predetermined manner.

2. A laser according to claim 1 further characterized in that said gaseous gain mixture includes a rare gas at a partial pressure of greater than 3 atmospheres; said xenon at a partial pressure of less than 100 Torr; said $NF_3$ at a partial pressure of less than 50 Torr and said $F_2$ at a partial pressure of less than 20 Torr.

3. A laser according to claim 2, in which said $NF_3$ has a partial pressure of approximately 8 Torr and said $F_2$ has a partial pressure of approximately 8 Torr.

4. A laser according to claim 2, in which the $NF_3-F_2$ ratio is greater than 0.3 and less than 3.0.

5. An excimer laser comprising:
    a gaseous gain medium comprising a buffer gas, xenon and a fluorine donor gas;
    means for electrically exciting said gain medium to form a quantity of xenon fluoride in the excited C state; and
    means for amplifying xenon fluoride C-A radiation of the 450–520 nm wavelength band in said gaseous gain medium, characterized in that:
    said fluorine donor gas is a synthesized fluorine donor gas formed from at least two fluorine-bearing molecular species combined in a predetermined proportion such that the absorption of radiation by ionized and excited species is primarily suppressed by a first one of said at least two fluorine-bearing molecular species.

6. An excimer laser according to claim 5, further characterized in that electron attachment within said gain medium is primarily controlled by the second of said at least two fluorine-bearing molecular species.

7. An excimer laser according to claim 6, further characterized in that said at least two fluorine-bearing molecular species are $F_2$ and $NF_3$.

* * * * *

UNITED STATES PATENT AND TRADEMARK OFFICE
CERTIFICATE OF CORRECTION

PATENT NO. : 4,660,210

DATED : April 21, 1987

INVENTOR(S) : William L. Nighan, Frank K. Tittel, William L. Wilson, Jr.

It is certified that error appears in the above-identified patent and that said Letters Patent is hereby corrected as shown below:

Column 1, line 40: cancel "CX- A" and substitute -- C- A --

Column 4, line 34: cancel "and" and substitute -- said --

Signed and Sealed this

Seventeenth Day of November, 1987

Attest:

DONALD J. QUIGG

Attesting Officer

Commissioner of Patents and Trademarks